US010503476B2

(12) United States Patent
Best (10) Patent No.: US 10,503,476 B2
(45) Date of Patent: *Dec. 10, 2019

(54) SELF-TIMED RANDOM NUMBER GENERATOR

(71) Applicant: Cryptography Research, Inc., Sunnyvale, CA (US)

(72) Inventor: Scott C. Best, Palo Alto, CA (US)

(73) Assignee: Cryptography Research, Inc., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/115,917

(22) Filed: Aug. 29, 2018

(65) Prior Publication Data

US 2019/0012146 A1    Jan. 10, 2019

Related U.S. Application Data

(63) Continuation of application No. 15/528,069, filed as application No. PCT/US2015/060412 on Nov. 12, 2015, now Pat. No. 10,095,477.

(60) Provisional application No. 62/130,525, filed on Mar. 9, 2015, provisional application No. 62/093,918, filed on Dec. 18, 2014.

(51) Int. Cl.
*G06F 7/58* (2006.01)

(52) U.S. Cl.
CPC .............. *G06F 7/588* (2013.01); *G06F 7/582* (2013.01)

(58) Field of Classification Search
CPC .................................................. G06F 7/58–588
USPC ................................................. 708/250–256
See application file for complete search history.

(56) References Cited

U.S. PATENT DOCUMENTS

| 4,905,176 | A | 2/1990 | Schulz |
| 5,007,087 | A | 4/1991 | Bernstein et al. |
| 5,696,828 | A | 12/1997 | Koopman, Jr. |
| 6,788,787 | B1 | 9/2004 | Shono et al. |
| 7,206,797 | B2 | 4/2007 | Gressel et al. |
| 7,389,316 | B1 | 6/2008 | Baetoniu |
| 8,150,900 | B2 | 4/2012 | Govic |
| 9,600,238 | B2 | 3/2017 | Radwan et al. |

(Continued)

FOREIGN PATENT DOCUMENTS

FR    2986679 A1 * 8/2013 ............... H03K 3/84

OTHER PUBLICATIONS

A. Cherkaoui, V. Fischer, A. Aubert, L. Fesquet, "A self-timed ring based true random number generator", Proc. IEEE 19th Int. Symp. Asynchron. Circuits Syst. (ASYNC), pp. 99-106, May 2013 (Year: 2013).*

(Continued)

*Primary Examiner* — Matthew D Sandifer
(74) *Attorney, Agent, or Firm* — Lowenstein Sandler LLP (57) ABSTRACT

The embodiments described herein describe technologies of self-timed pattern generators. The self-timed pattern generators can be used to form a random number generator to generate a random digital value. Asynchronous digital logic in a first generator asynchronously updates a next state based on a current state, a second state of a second generator that is before the first generator in the chain or ring topology, and a third state of a third generator that is after the first generator in the chain or ring topology. The self-timed pattern generators are to output a random digital value based at least in part on the current state output from the first generator.

20 Claims, 8 Drawing Sheets

(56) References Cited

U.S. PATENT DOCUMENTS

| | | |
|---|---|---|
| 2004/0153291 A1 | 8/2004 | Kocarev et al. |
| 2004/0193664 A1 | 9/2004 | Shimasaki |
| 2004/0205095 A1 | 10/2004 | Gressel et al. |
| 2006/0098500 A1 | 5/2006 | Chen et al. |
| 2008/0183785 A1 | 7/2008 | Katz et al. |
| 2009/0132624 A1 | 5/2009 | Haselsteiner et al. |
| 2010/0091700 A1 | 4/2010 | Michaels |
| 2010/0281088 A1 | 11/2010 | Wilber |
| 2011/0006807 A1 | 1/2011 | Schneiderwind |
| 2011/0222584 A1 | 9/2011 | Michaels |
| 2014/0191813 A1 | 7/2014 | Sul et al. |

OTHER PUBLICATIONS

I. E. Sutherland, "Micropipelines", Commun. ACM, vol. 32, No. 6, pp. 720-738, Jun. 1989 (Year: 1989).*

Ayanzadeh, Ramin et al., "Multi-Layer Cellular Automata for Generating Normal Random Numbers", Proceedings of the 18th Iranian Conference on Electrical Engineering (ICEE 2010), May 11-13, 2010. 6 pages.

Cherkaoui, Abdelkarim et al., "A Very High Speed True Random Number Generator with Entropy Assessment", 15th International Workshop on Cryptographic Hardware and Embedded Systems, CHES 2013, Aug. 2013, 8086, pp. 179-196, Security and Cryptology. 19 pages.

Cherkaoui, Abdelkarim et al., "Comparison of Self-Time Ring and Inverter Ring Oscillators as Entropy Sources in FPGAs", 2012 Design, Automation & Test in Europe Conference & Exhibition (DATE), pp. 1325-1330, 2012. 6 Pages.

Hortensius, P.D. et al., "Parallel Random Number Generation for VLSI Systems Using Cellular Automata", IEEE Transactions on Computers, vol. 38, No. 10, pp. 1466-1473, Oct. 1989. 8 pages.

Notification of Transmittal of International Preliminary Report on Patentability dated Apr. 20, 2017 re: Int'l Appln. No. PCT/US15/060412. 12 Pages.

Sipper, Moshe & Tomassini, Marco.Generating Parallel Random Number Generators by Cellular Programming. International Journal of Modern Physics C. vol. 7, No. 2 (1996) 181-190.

Wolfram, Stephen, "Cryptography with Cellular Automata", Nov. 1985, Advances in Cryptology, CRYPTO '85 Proceedings, Section VI, pp. 429-432. 4 pages.

Wolfram, Stephen, "Random Sequence Generation by Cellular Automata", Advances in Applied Mathematics, vol. 7, pp. 123-169, 1986. 47 pages.

David P. Rosin et al., "Ultra-Fast Physical Generation of Random Numbers Using Hybrid Boolean Networks" Physical Review E, vol. 87, Issue 4, id. Published Apr. 2013.

* cited by examiner

SELF-TIMED RANDOM NUMBER GENERATOR

RELATED APPLICATIONS

This application is a continuation application of U.S. patent application Ser. No. 15/528,069, filed May 18, 2017, which is a National Stage entry of PCT/US2015/060412, filed Nov. 12, 2015, which claims benefit to U.S. Provisional Application No. 62/130,525, filed Mar. 9, 2015, and U.S. Provisional Application No. 62/093,918, filed Dec. 18, 2014, each of which is incorporated by reference herein.

BACKGROUND

Various applications utilize a random number generator (RNG) to generate a sequence of numbers that lack any predictable pattern. There are many applications of randomness and there are several different methods for generating random data. It should be noted that several computational methods for random number generation exist, but many fall short of "true" randomness. Rather these methods may meet, with varying success, some of the statistical tests for randomness intended to measure how unpredictable their results are. That is, to what degree their patterns are discernible. The uncertainty is often quantified in terms of "entropy," a standard measure of unpredictability of information content.

A pseudorandom number generator (PRNG), also known as a deterministic random bit generator (DRBG), is an algorithm for generating a sequence of numbers whose properties approximate the properties of sequences of random numbers. The PRNG-generated sequence is not truly random, because it is completely determined by a relatively small set of initial values, called the PRNG's seed (which may include truly random values). Although sequences that are closer to truly random can be generated using specialized hardware (e.g., ones based on quantum-mechanical effects), pseudorandom number generators are important in practice for their speed in number generation, and their practicality for being implemented in low-cost compute systems. Cryptographic systems need a good source of randomness, for example, to be used for key generation or cryptographic challenges. There are cryptographically secure computationally based methods of generating random numbers, such as, for example, those based on the Yarrow algorithm and the Fortuna (PRNG), and others. Cryptographically strong PRNGs may be seeded by many independent sources of uncertainty, some of which may be under an attacker's control. A good seed source may be a true random number generator (TRNG), which is tied to some known-random physical phenomena (e.g., offset, thermal noise, phase noise, or the like). A sequence of numbers from a chaotic (as opposed to random) generator is similar to PRNGs in that it is deterministic, rule-based, and evolves predictably from an initial state.

BRIEF DESCRIPTION OF THE DRAWINGS

The present disclosure is illustrated by way of example, and not by way of limitation, in the figures of the accompanying drawings.

DETAILED DESCRIPTION

The embodiments described herein describe technologies of self-timed, digital chaotic pattern generators. The self-timed, digital chaotic pattern generators (also referred to as asynchronous, chaotic generators (CGs)) can be used to form an N-bit, self-timed, random number generator (RNG) to generate a random value using an entirely digital circuit design methodology. Note that the use of "chaotic" herein is intended to reflect the generally accepted meaning of the term; specifically, a chaotic pattern generator is one that creates complicated patterns which are dependent on the generator's initial conditions and that evolve in an unpredictable manner.

Cryptographic systems need a good source of randomness, for example, to be used for key generation or cryptographic challenges. Chaotic pattern generators have utility in semiconductor cryptographic systems as both entropic sources and as sources for XOR mixing with other entropic sources. A chaotic generator based on a synchronous logic circuit, however, has a property similar to any finite state machine: if both the complete digital state of the generator and the number of synchronous updates is known, all subsequent digital states are easily predicted. Such prediction is contrary to the requirements of a strong cryptographic system.

The embodiments described herein are directed to chaotic pattern generation to obtain a random number generator (RNG) with several properties expected of a true random number generator (TRNG). As described above, a TRNG is tied to some random physical phenomena (e.g., transistor offset, thermal noise, phase noise, or the like). Also, a chaotic sequence (as opposed to a random sequence) is deterministic, rule-based, and evolves predictably from an initial state. The embodiments of chaotic pattern generators, as described herein, are constructed in such a way that each bit of an N-bit generator "self-updates" at an unpredictable rate. Furthermore, the transitions of each bit in the N-bit generator affect the updates of both of its neighbors. For example, by arranging the N-bit generator in a ring-based topology, and controlling an update window with an intrinsically asynchronous system clock signal, a chaotic generator with good entropic performance, with low power consumption, and suitable for VLSI integration can be achieved. It should be noted that although the update window is controlled, the N updates rates of the individual chaotic generators are not controlled because the chaotic generators are self-timed based on their unique physical properties as well as updates to their inputs. In one embodiment, each chaotic generator is a one-dimensional, binary cellular automata circuit that implements a "Rule-30" algorithm. Alternatively, other asynchronous digital logic can be used to generate chaotic patterns using other techniques.

As described herein, the randomness of a random number generated by the embodiments described herein is based on the interaction of the self-timed, digital chaotic generators ("CGs") organized in the looping sequences, as well as the metastability of internal latches of these chaotic generators, as described herein. The embodiments described herein may be used for various cryptographic applications, such as seeds for cryptographic generation or key generation. The embodiments of the self-timed digital CGs can be built using ordinary VLSI circuits found in everyday standard-cell libraries. The chain of CGs organized in a looping sequence, such as a ring configuration, can be considered a self-timed state machine, where each bit in the state machine generates its own timing and one stage's timing events affect both of its neighbors. Since the chain of CGs is organized in the looping sequence, a single timing event can propagate to all stages. For example, a pattern generation circuit itself may include a ring of substantially similar combinational logic elements, where each element is configured to receive as an input a current state of at least two other elements in the ring, and where each element's update rate is asynchronous with respect to every other element. In a further embodiment, each element implements a binary cellular automata rule, such as the cellular automata Rule-30 update rule algorithm. Alternatively, other binary cellular automata rules can be used; as described above, the ideal ones create complicated patterns that evolve in an unpredictable manner.

The embodiments described herein provide a fully synthesizable, random number generator. The CGs are all digital circuits and can be built using standard-cell gates, can be auto placed and routed (P&R'd) without requiring hand-tuning and hand-layout, and can be tested using low-cost, all-digital manufacturing tests. The embodiments may have very fast startup time because there is no preconditioning of the circuit. The embodiments can have a high-bandwidth, e.g., 8 bits every 50 MHz at very low power. As the circuit is all-digital, the embodiments also consume very little standby power, limited only by the leakage current of the standard cell gates. The embodiments may tradeoff update rate for maximum per-bit entropy, but the self-timed and looping sequence and natural circuit mismatch helps improve entropy performance. The self-timed RNGs described herein can be used in connection with other cryptographic operations to improve entropy performance. For example, two or more bits can be mixed (e.g., combined via at least one XOR gate) for improved entropy performance.

Figure 1:
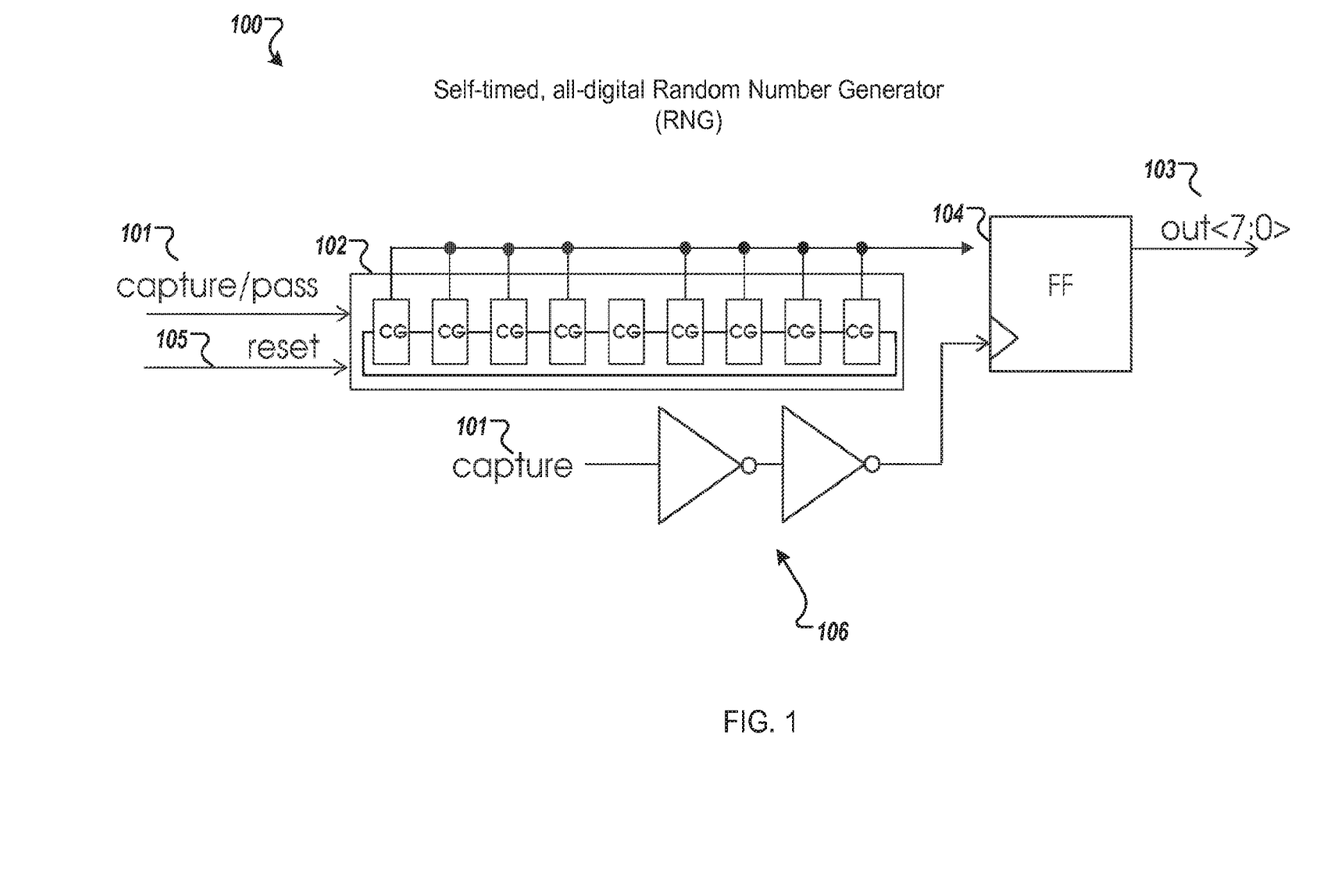
FIG. 1 is a schematic diagram of a self-timed, digital random number generator (RNG) including a chain of chaotic pattern generators (CGs) organized in a looping sequence to generate a random digital value according to one embodiment.

FIG. 1 is a schematic diagram of a self-timed, all-digital random number generator (RNG) 100 including a chain of chaotic pattern generators (CGs) 102, organized in a looping sequence, to generate a random digital value 103 according to one embodiment. Outputs of the chain of CGs 102 are coupled to flip-flop (FFs) 104. In one embodiment, the looping sequence is a ring topology in which a last CG in the chain is coupled to a first CG in the chain to create a ring. The individual CGs of the chain 102 are constructed using asynchronous digital logic, and may include an internal latch that can be activated to store the circuit's current state (Q1). The asynchronous digital logic is configured similar to a one-dimensional cellular automata, such that it will update a next state of the individual CGs based on a current state of itself and current states of at least two other neighboring CGs. For example, the internal latch of a first one of the CGs in the chain 102 stores a current state (Q1) and the asynchronous digital logic of the first one of the CGs in the chain 102 asynchronously updates a next state based on the current state (Q1), a second state (Q0) of a second one of the CGs that is before the first one in the chain 102, and a third state (Q2) of a third one of the CGs that is after the first one in the chain 102. In one embodiment, the next state (Q1') is determined by the cellular automata Rule-30 equation: Q1'=Q0 XOR (Q1 OR Q2). Alternatively, other equations may be used in the asynchronous digital logic of the CGs (e.g., the mirror image, complement, and mirror complement of Rule-30 (Rule-86, Rule-135, and Rule-149, respectively) also deliver effective chaotic generation performance). Note also that higher-dimensional cellular automata can also be used (e.g., a 2D cellular automata could be built in a grid pattern, and each individual CG would be affected by the other CG's before, after, above and below it).

The FFs 104, which are coupled to the outputs of the CGs in the chain 102, represent how a nearby digital circuit can effectively capture a random digital value 103 from the output of the RNG in response to a control signal 101, referred to herein as a capture/pass signal (or C/P signal). For example, when "Pass" is active (capture not active), an internal latch in the CG is transparent, and the chaotic pattern generation is active. When "Capture" is active, the latches in the RNG capture their current state, pattern generation stops, and the captured state can be sampled by the FFs 104. In one embodiment, the FFs 104 are clocked based on the capture signal 101 through a delay element (represented by a pair of inverters 106) which creates a slight delay between the CGs seeing the capture signal and the FFs latching their outputs. In other embodiments, the FF's are clocked by other clock signals in the system. In other embodiments, the RNG is designed without any latching element in the CGs, and is left in the generation state continuously. Note that the entropy of the random digital value 103 is based on both the asynchronous, self-timed chaotic mixing, as well as the metastability of the internal latches of the CGs in the chain 102 experienced during a transition from "Pass" to "Capture."

In the depicted embodiment, the chain 102 is organized in a ring topology and forms an 8-bit RNG and the FFs 104 capture the output of the CGs in the chain 102 and outputs the digital random value 103. In this embodiment, the chain 102 includes nine CGs, where eight CGs in the chain 102 are coupled to the FFs 104 and one CG in the chain 102 is not coupled to the FFs 104, but is still coupled to two neighboring CGs in the chain 102. The one CG in the chain 102 may be reset based on a reset signal 105 to avoid a stable state of the chain 102. For example, when a pre-defined digital value is detected on the outputs of the CGs, the one CG is reset by the reset signal 105. For example, when using the Rule-30, a stable state of the chain 102 may occur when an all-zero state occurs. The all-zero state is stable because the next state will also be all zeros, and so forth. In one embodiment, when the all-zero state is detected when using Rule-30, the output of the one CG is forced to a "1" value based on the reset signal 105, which forces the Rule-30 generation to continue. The reset signal 105 may be received from an external circuit, such as value detector logic as described herein. Although this chain 102 includes nine CGs with one CG not coupled to the FFs 104, in other embodiments, the chain 102 may include more or less CGs and may include more than one CG that is not coupled to the FFs 104.

In another embodiment, the chain 102 of CGs is organized in an N-bit RNG, where N is a positive integer larger than 2. The N-bit RNG is responsive to the control signal 101. In a first mode of the control signal 101, the N-bit RNG is to actively generate new N-bit random digital values. This can be considered a pass mode for the internal latches of the N-bit RNG. In a second mode of the control signal 101, the N-bit RNG latches its current state. This can be considered a capture mode for the internal latches of the N-bit RNG.

In one embodiment, the asynchronous digital logic of an individual CG includes logic primitives that implement a one-dimensional binary cellular automaton rule equation. In one embodiment, the one-dimensional binary cellular automaton rule equation is Rule-30. In other embodiments, the one-dimensional binary cellular automaton rule equation is one chosen for its long cycle between repeating values, including the chaotic pattern Rule-30, Rule-86, Rule-135, or Rule-149. Additional details regarding the one-dimensional binary cellular automaton rule equations are described below.

In another embodiment, the chain 102 is multiple CGs arranged in a looping sequence. As described above, the looping sequence may be a ring. In other embodiments, other looping sequences may be used. For example, a first CG may be coupled to a second CG earlier in the looping sequence and a third CG later in the looping sequence. The CGs arranged in the looping sequence asynchronously generates random digital values based on the current states of the CGs. When the control signal 101 is received, the current states of the CGs are captured as a random digital value.

The second, first, and third CGs may be located sequentially adjacent to one another in physical space. In other embodiments, the second, first, and third CGs may be located apart (non-sequentially) to one another in physical space. For example, there may be one or more intervening CGs in between the second and first CGs and one or more intervening CGs in between the first and third CGs.

In another embodiment, the CGs in the chain 102 are arranged in a looping sequence (e.g., ring topology) in which the second CG is directly adjacent to the first CG in one direction in the looping sequence and the third CG is directly adjacent to the first CG in another direction in the looping sequence. A respective one of the CGs may be coupled to a first directly adjacent CG in the looping sequence and to a second directly adjacent CG in the looping sequence.

In another embodiment, the CGs in the chain 102 are arranged in a looping sequence (e.g., ring topology) in which the second CG is not directly adjacent to the first CG but precedes the first CG in one direction in the looping sequence and the third CG is not directly adjacent to the first CG but succeeds the first CG in another direction of the looping sequence. The second CG may precede the first CG in the ring topology and the first CG precedes the third CG in the ring topology. In another embodiment, the second CG is at least two positions away from the first CG in a first direction of the ring topology and the third CG is at least two positions away from the first CG in a second direction of the ring topology. Alternatively, the CGs may be configured in other looping sequences, such as a daisy-chain configuration.

The CGs are self-timed in that a next state of an individual CG is updated asynchronously. That is, the update occurs regardless of any synchronizing clock signal. The CGs are digital CGs and can be built using a standard-cell library. In semiconductor design, standard cell methodology is a method of designing application-specific integrated circuits (ASIC) with mostly digital-logic features. For example, each CG may be made up of about ten NAND gate equivalents of a standard cell library.

Figure 2:
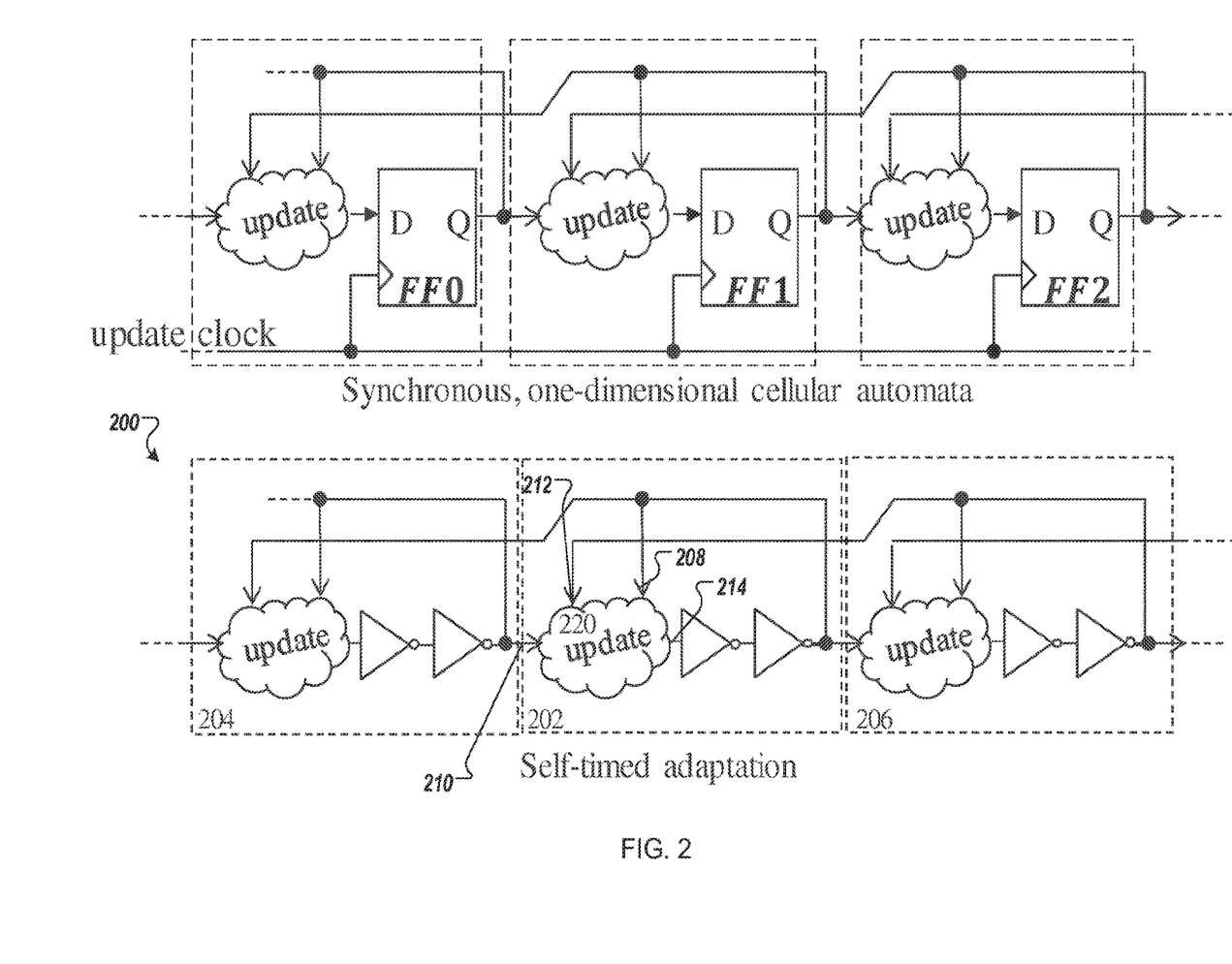
FIG. 2 illustrates how a synchronous one-dimensional cellular automata can be adapted into a self-time apparatus suitable for implementing a chaotic pattern generator in a portion of a looping sequence according to one embodiment.

FIG. 2 illustrates how a synchronous one-dimensional cellular automata can be adapted into a self-timed apparatus suitable for implementing a chaotic pattern generator in a portion 200 of a looping sequence according to one embodiment. The portion 200 includes a first CG 202, a second CG 204, and a third CG 206. For ease of description, the first CG 202 is described, but the second CG 204 and third CG 206 are similar. The first CG 202 includes asynchronous digital logic 220 to affect an update algorithm. The asynchronous digital logic circuit 220 includes logic primitives to perform a logical operation (f) and may include an internal latch to store a current state of the first CG 202. The asynchronous digital logic circuit 220 includes a first output 214, a first input 208, a second input 210, and a third input 212. The first input 208 is coupled to the first output 214 and the first input 208 represents a first state (Q1) of the first CG 202. The second input 210 is coupled to a second output of the second CG 204 and represents a second state (Q0) of the second CG, and the third input 212 is coupled to a third output of the third CG 206 and represents a third state (Q2) of the third CG 206. The asynchronous digital logic circuit 220 is to update a next state (Q1') of the first CG 202 using the Q0, Q1, and Q2 signals. The asynchronous digital logic circuit 220 updates the next state (Q1') using a logical operation that generates complicated, unpredictable patterns, such as the one expressed by the following equation: Q1'=Q0 XOR (Q1 OR Q2)

The first CG 202 may also include a latch (not shown) that can be configured to capture the first output 214. The latch will capture the current state (Q1) when signaled by a capture signal (not shown). The latches of the CGs collectively output a random digital value when clocked by the capture signal. As described above, the entropy of the random digital value is based on the uncertain update rate of each of the chaotic generators as well as the metastability of the latches of the CGs during a transition from "Pass" to "Capture." The inherent mismatches of the circuits used for the asynchronous digital logic circuits of the CGs also contribute to the unpredictability of the individual update rates of the individual CGs.

Although three CGs are illustrated in FIG. 2, in another embodiment, the CGs are organized in a first N-bit RNG, where N is a positive integer of at least 3 elements. Internal latches of the CGs may be configured to receive the capture signal, wherein the plurality of CGs is will capture their current state when the capture signal is active. The entropy of the first N-bit value is based on the uncertain update rate of each of the CGs and the metastability of the internal latches of the CGs. That is, the entropy is affected by both asynchronous, self-timed chaotic mixing of the CGs, as well as the metastability of the internal latches experienced during transitions from "Pass" to "Capture."

The self-timed digital RNG described herein is based on the broad concepts of one-dimensional cellular automata ("1-D CA"). A 1-D CA is a hardware state machine where every element's next state (Q1') depends on its own state (Q1) and the states of two neighboring elements (Q0 and Q2). Neighboring elements may be directly adjacent in physical locations or may be positioned with one or more elements between each other. On every edge of a synchronizing clock signal, each bit in the state machine updates. There are eight possible states for binary values Q0, Q1, Q2, and so there are $2^8$ possible update "rules" for Q1'. For example, a large binary cellular automata Rule-30 synchronous state machine creates complicated, unpredictable (i.e., "chaotic") patterns, but eventually for a finite-sized state machine, the whole state will repeat. In general, a synchronous 1-D CA can be utilized as an effective random number generator, when: 1) the number of bits in the state machine is large that can be observed where higher is better; 2) the initial value of the state machine is unpredictable; and 3) the number of unique updates between observations where unpredictable is better; and 4) the update rule generates complicated, unpredictable patterns (e.g., Rule-30). To achieve a 1-D CA Rule-30-based random number generator in a small digital circuit, the hardware state machine is, in one embodiment, realized as a self-timed state machine that is organized into a ring, or other looping sequence, where each bit in the state machine generates its own timing. That is, each element is self-timed and is updated at its own individual update rate based on its own current state and the states of two neighboring element. This could be considered a ring oscillator that can optionally be latched. In one embodiment, the self-timed elements are self-timed chaotic generators, where each self-timed chaotic generator uses an update rule that generates complicated, unpredictable patterns such as is produced by the Rule-30 equation: Next State Q1'=Q0 XOR (Q1 OR Q2).

In another embodiment, a pattern generation circuit includes a ring of substantially similar combinational logic elements where each element is configured to receive as inputs current states of its own and current states of two other elements in the ring. Each element's update rate is asynchronous with respect to every other element. In a further embodiment, each element implements the cellular automata Rule-30 update rule algorithm. In another embodiment, a chain of self-timed chaotic generators is organized in a ring topology, and each chaotic generator updates its own state based on three inputs: its current state ("Q1"), the state of a generator before it in the chain ("Q0"), and the state of a generator later in the chain ("Q2"). Each chaotic generator is responsive to a control signal, where in a first mode of the control signal, the chaotic generator is actively generating new values and in a second mode of the control signal, the chaotic generator latches its current state. The chaotic generator is built using logic primitives that implement the Rule-30 logic equation as follows: Next State Q1'=Q0 XOR (Q1 OR Q2).

Figure 3:
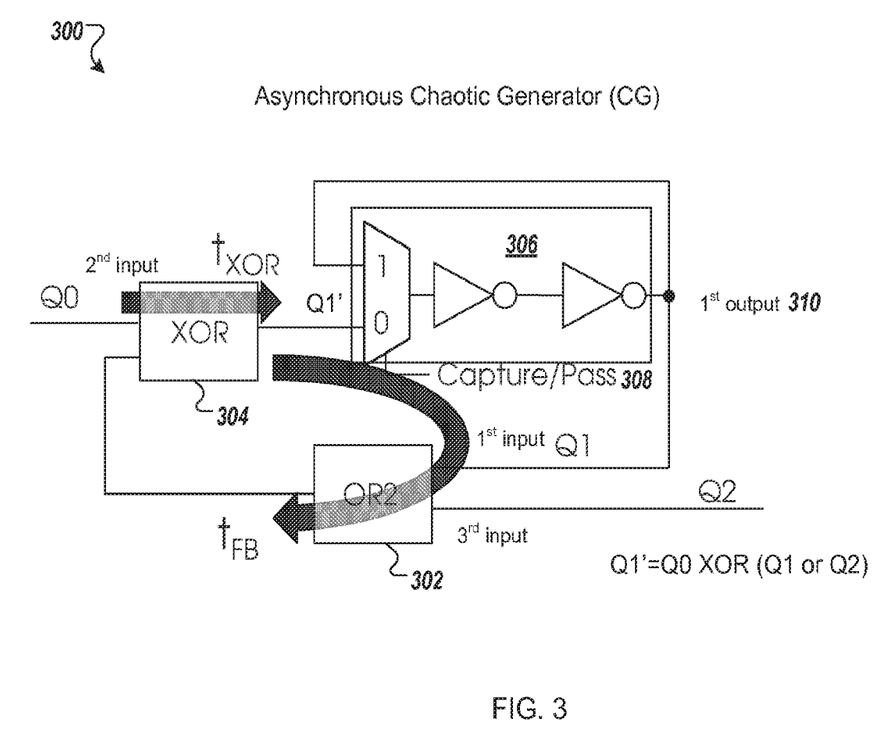
FIG. 3 is a schematic diagram of an asynchronous digital logic circuit of a chaotic generator according to one embodiment.

FIG. 3 is a schematic diagram of an asynchronous digital logic circuit 300 of a chaotic pattern generator according to one embodiment. The asynchronous digital logic circuit 300 includes: a first logic gate 302 coupled to the first input (Q1) and the third input (Q2); a second logic gate 304 coupled to the second input (Q0) and an output of the first logic gate 302; and an internal latch 306 coupled to an output of the second logic gate 304. The internal latch 306 is configured to receive a capture signal 308. The internal latch 306 is configured to permit chaotic pattern generation based on Q0, Q1, and Q2 when the capture signal 308 is not active and to stop the chaotic pattern generation when the capture signal 308 is active. An output 310 of the asynchronous digital logic circuit 300 is one bit of a random digital value. As described earlier, the entropy of the output 310 is based on the self-timed chaotic generation of each instance of circuit 300 and the metastability of the internal latch 306 on a transition from the Pass to Capture state.

In FIG. 3, the first logic gate 302 is an OR gate and the second logic gate 304 is an exclusive-OR (XOR) gate. The OR gate performs an OR operation on Q1 and Q2 and the XOR gate performs an XOR operation on the output of the OR gate and Q0. The next state (Q1') at the output of the XOR gate is therefore represented by the following equation: Q1'=Q0 XOR (Q1 OR Q2).

In a further embodiment, the internal latch 306 includes a multiplexer and a pair of sequential inverters. The multiplexer is coupled to the first output 310 and the output of the XOR gate (Q1'). The multiplexer is configured to pass the output of the XOR gate when the capture signal is not active and to capture the first output when the capture signal is active. The pair of sequential inverters is coupled between an output of the multiplexer and the first output 310. Other latching embodiments could readily substitute for this one.

The asynchronous digital logic circuit 300 is used as a self-timed chaotic generator (CG) as described herein. The self-timed chaotic generator has some timing features. For example, when Q0=1 and Q2=0, Q1 updates at a rate expressed as follows: $1/(t_{XOR}+t_{FB})$, where $t_{XOR}$ represents the unpredictable propagation delay of the data path through the XOR gate and $t_{FB}$ represents the unpredictable propagation rate of the data path through the inverters and back via the OR gate. The update rate of each CG in the chain will therefore be slightly different for every bit in the chain. Any uncertainty on the duration of the Capture/Pass signal (e.g., jitter) further adds to the uncertainty of the number of updates. Also, on the transition from "Pass" mode to "Capture" mode, the "Q1'" signal is moving asynchronously with respect to the Capture/Pass signal, (i.e., exposing the latch to a metastability condition), which contributes to the entropy of the random digital value.

Figure 4:
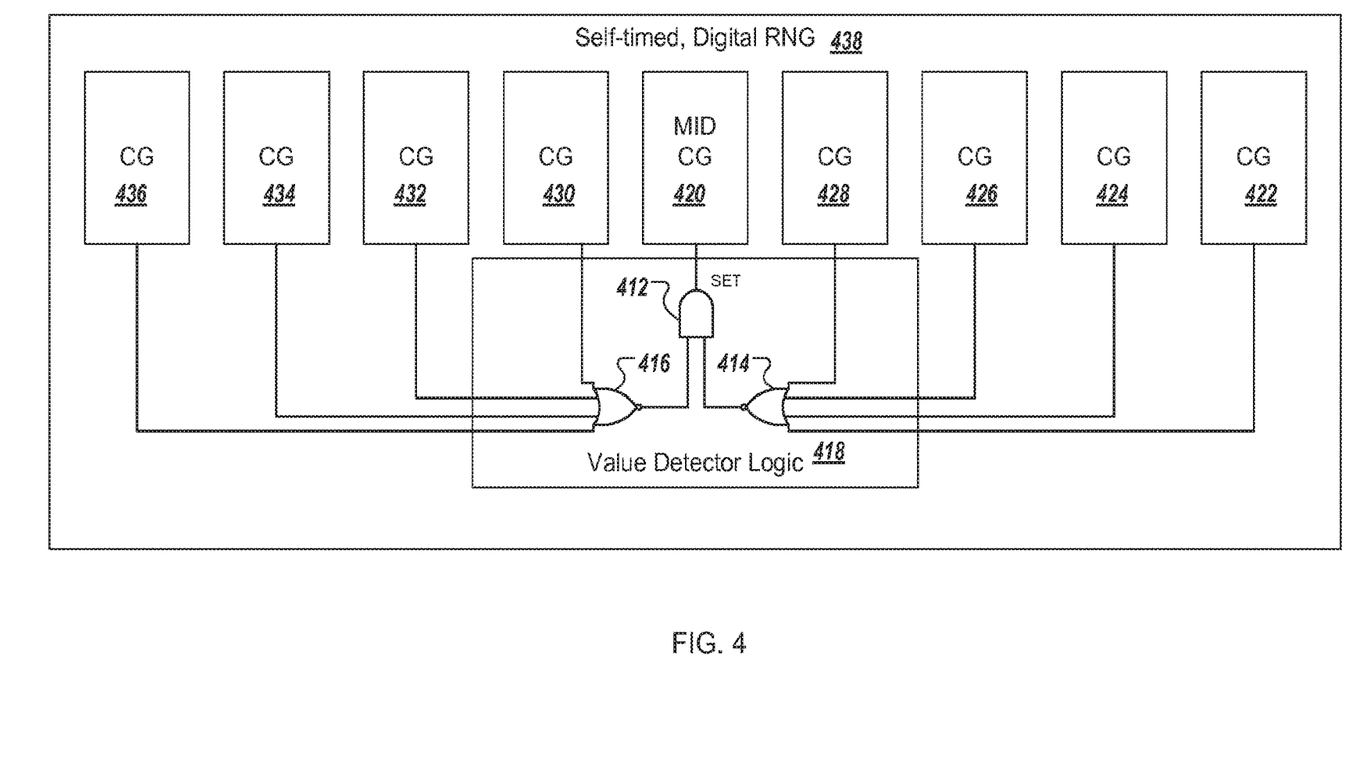
FIG. 4 is a schematic diagram of a self-timed, digital RNG including a value detector logic coupled to a chain of chaotic pattern generators according to one embodiment.

FIG. 4 is a schematic diagram of a self-timed RNG 400 including a value detector logic 406 coupled to a chain of nine chaotic pattern generators (CGs) according to one embodiment. The chain of CGs includes eight CGs 402 and a middle CG 404. It should be noted that the middle CG 404 can be located in any position of the chain, but is used in the middle for description purposes. The chain of CGs are organized in a looping sequence in which each CG is coupled to at least two other CGs in the chain as described herein, even though the connections between the CGs have not been illustrated in FIG. 4. The value detector logic 406 includes inputs coupled to the outputs of the CGs 402 and a reset output coupled to a reset input of one of the CGs 404 (middle CG) to reset the one CGs 404 when the outputs of the CGs 402 matches a pre-defined value.

In one embodiment, the value detector logic 406 includes a first NOR gate 408 coupled to four CGs 402 and a second NOR gate 410 coupled to the other four CGs 402. Outputs of the first NOR gate 402 and the second NOR gate 410 are coupled to inputs of an AND gate 412. An output of the AND gate 412 is coupled to a reset input of the middle CG 404. In this embodiment using NOR gates, the value detector logic 406 can be configured to detect all zeros in the CGs 402 and force the middle CG 404 to output a one (regardless of its current state), which affects the states of neighboring CGs as described herein. Although the value detector logic 406 depicted in FIG. 4 is configured to match an 8-bit value against a pre-defined 8-bit value, such as zero, in other embodiments, the value detector logic 406 may include different logic primitives to match a N-bit number to a pre-defined N-bit number. In other embodiments, the reset signal can be input into more than one CG 404.

Figure 5:
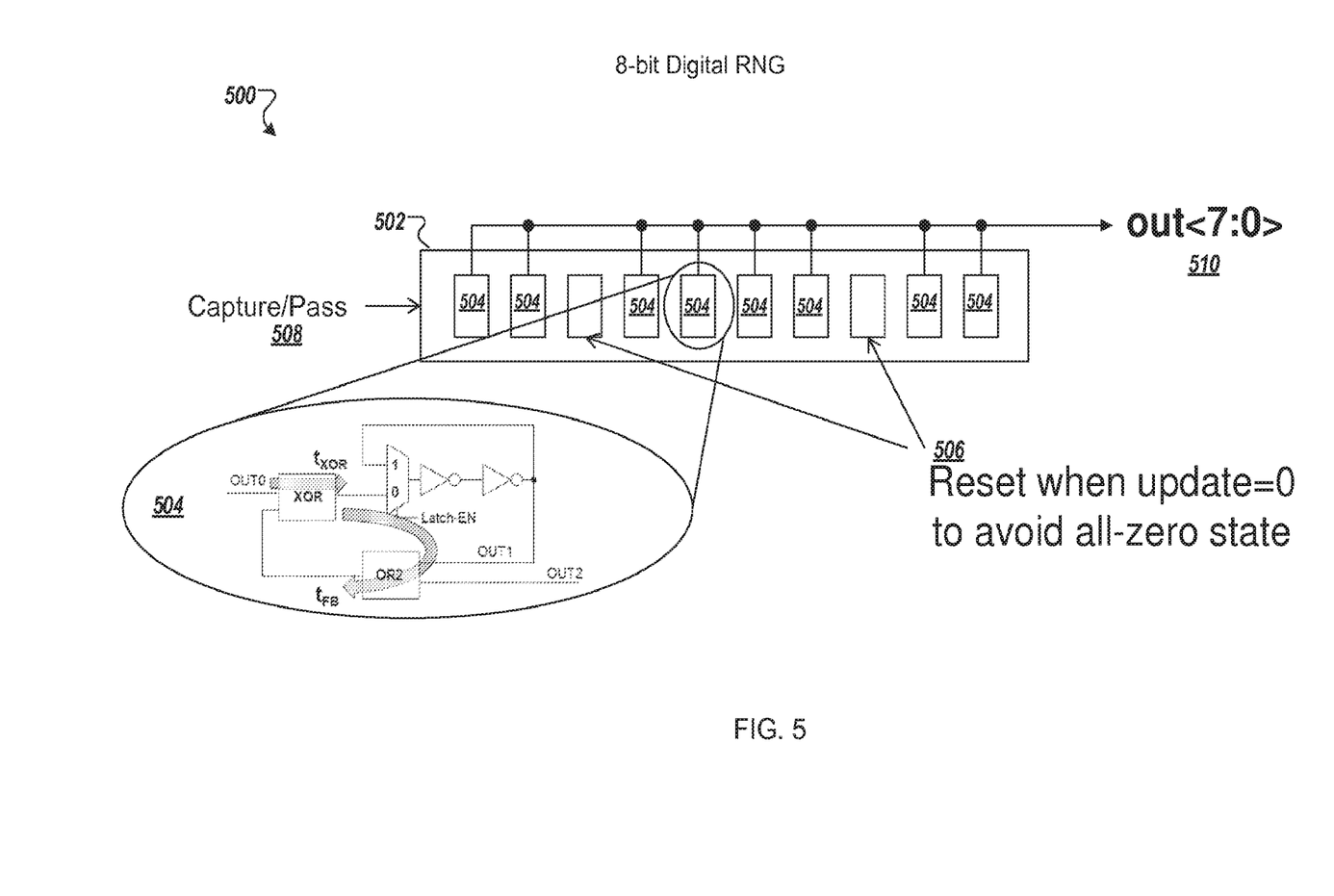
FIG. 5 illustrates a schematic diagram of an 8-bit digital RNG with a chain of ten self-timed chaotic pattern generators that force a known state in two of the ten bits according to one embodiment.

In addition to value detector logic, it may also be beneficial to force some of the bits in the ring to a known state whenever the mix operation is halted (e.g., by assertion of the optional capture signal described above). FIG. 5 illustrates a schematic diagram of an 8-bit digital RNG 500 with a chain 502 of ten self-timed chaotic pattern generators (CGs) that forces a known state in two of the ten bits according to one embodiment. The ten self-timed CGs may each be an asynchronous digital logic circuit, as described earlier and illustrated in the exploded view of FIG. 5. The asynchronous digital logic circuit may be the asynchronous digital logic circuit 300 illustrated and described with respect to FIG. 3 that implements Rule-30. Alternatively, the asynchronous digital logic circuit may be other circuits that generate complicated, unpredictable patterns by asynchronously updating a next state based on its own current state and the states of at least two neighboring CGs. The chain 502 includes eight CGs 504, whose outputs make up a random digital value 510, and two CGs 506 whose outputs are not used for the random digital value 510. The two CGs 506 are not used as part of the random digital value 510, but are coupled in the chain 502 of self-timed CGs. When the 8-bit digital RNG 500 receives a capture=active signal 508 from an external circuit (e.g., a synchronous processor that requires random values for some operation), the two CGs 506 are forced to a known state (e.g., to a one so as to avoid an all-zero state in the random digital value 510). In some cases, depending on the update rule, an all-zero state will be a stable condition of the 8-bit digital RNG 500, which should be avoided as no entropy will be generated. The chain 502 of CGs 504 can be coupled to FFs. The FFs are configured to latch an 8-bit value output from the CGs 504 when a sample signal (not illustrated in FIG. 5) is active. As described above, the entropy of the 8-bit value is due to the self-timed nature of the chaotic generators as well as the metastability of the internal latches of the ten CGs.

In a further embodiment, the 8-bit value of this RNG circuit can be combined with an output of one or more other random number generators provided by a vendor of an IC in which the 8-bit digital RNG 500 is implemented. That is, in one embodiment, an integrated circuit includes the 8-bit digital RNG 500, an ASIC RNG, and mixing logic. The mixing logic may be coupled to an output of the FFs that capture the random digital value from the 8-bit digital RNG 500 and to an output of the ASIC RNG. The mixing logic combines the two values (e.g., via an XOR operation) to generate a new random digital value. Note that this combination of two 8-bit values could be done within the digital RNG circuit itself. For example, two 8-bit RNG circuits could be built and their 16-bit output combined via an 8-bit XOR into a single 8-bit result. Alternatively, the 8-bit digital RNG 500 can be used as a seed to the ASIC RNG and contributes to the entropic performance of the ASIC RNG. This technique of combining RNGs is generally practiced so that random values can still be generated even if an attacker has disabled some-but-not-all of the random generators.

Figure 6:
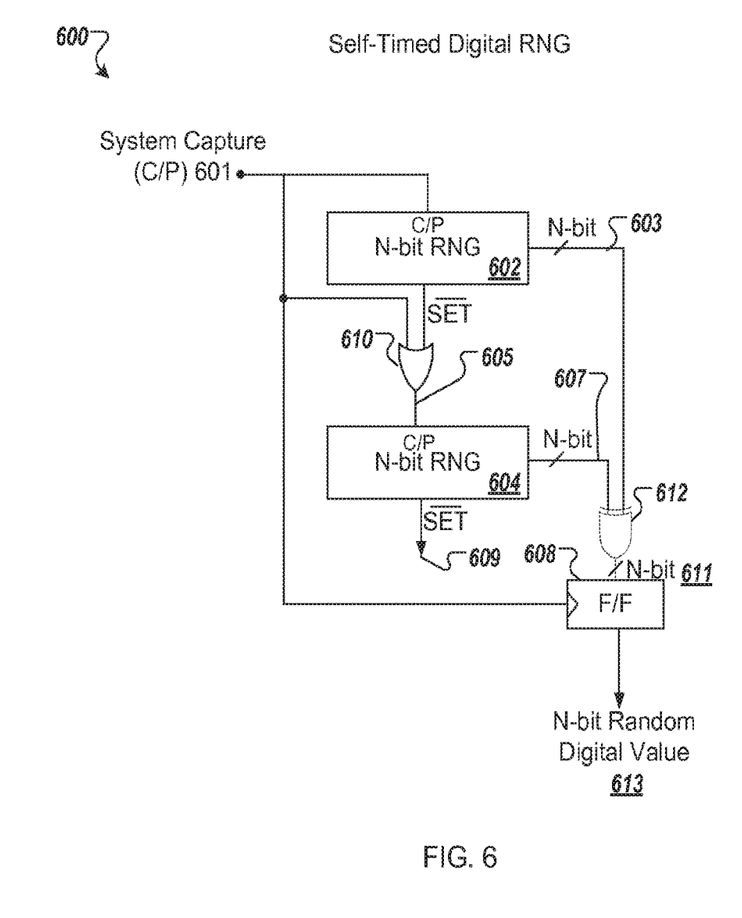
FIG. 6 is a schematic diagram of a digital RNG including two N-bit RNGs according to one embodiment.

FIG. 6 is a schematic diagram of a digital RNG 600 including two N-bit RNGs according to one embodiment. The digital RNG 600 includes a first N-bit RNG 602, where N is a positive integer. The first N-bit RNG 602 receives a system capture/pass (C/P) signal 601. More specifically, internal latches of the individual CGs are configured to receive the active-high system capture signal 601 (i.e., an active-low pass signal). These latches will capture and hold a first N-bit value 603 when the system capture signal 601 is active. As described above, the entropy of the first N-bit value 603 is based on the self-timed nature of the chaotic generators as well as the metastability of the internal latches of the first RNG 602. The first N-bit RNG 602 may include value detector logic to detect a pre-defined digital value in the first N-bit value 603. When the first pre-defined digital N-bit value 603 mismatches the pre-defined value (e.g., when the first RNG 602 is not producing the all-zero state), the value detector logic can be configured to output an active-low signal ($\overline{SET}$) on the reset output. An OR gate 610 is coupled to receive the active-low signal ($\overline{SET}$) from the reset output of the N-bit RNG 602 and the system capture signal 601. An output of the OR gate 610 operates as a second capture signal 605 to a second N-bit RNG 604. The internal latches of the individual CGs of the N-bit RNG 604 are configured to receive the second active-high capture signal 605 from the output of the OR gate 610. In this way, the second byte's capture and generation phases can be unpredictably controlled by the value detecting logic of the first byte, thereby generating further entropy. In addition to this new mechanism, the entropy of the second byte's N-bit value 607 is based on the self-timed nature of the chaotic generators as well as the metastability of the internal latches of the second RNG 604. XOR logic gate 612 is coupled to receive the first N-bit value 603 and the second N-bit value 607 and outputs a third N-bit value 611, which is then captured by a sampling FF 608. The XOR logic gate 612 performs an XOR operation on the first N-bit value 603 and the second N-bit value 607 to generate the N-bit random digital value 611 that is latched by the FF 608 when the capture signal 601 transitions from inactive to active (note that there may need to be a small delay (not shown) inserted between the capture signal 601 and the clock input of FF 608). An output FF 608 is an N-bit random digital value 613.

In a further embodiment, mixing logic is coupled to receive the N-bit random digital value 613 and a random number from a random number generator (RNG) provided by a vendor of an IC in which the self-timed digital RNG 500 is implemented. The mixing logic is configured to mix the N-bit random digital value 613 with the random number from the RNG to generate another random number.

The following table is the one-dimensional binary cellular automaton Rule-30 used by asynchronous digital logic in the self-timed chaotic generators in one embodiment. Rule-30 is a specific update rule that generates a chaotic pattern. The chaotic pattern can emerge even from an initial state where one cell is in state 1 and surrounding cells are state 0.

| Inputs | 111 | 110 | 101 | 100 | 011 | 010 | 001 | 000 |
|---|---|---|---|---|---|---|---|---|
| Output | 0 | 0 | 0 | 1 | 1 | 1 | 1 | 0 |

In one embodiment, the self-timed digital RNG 600 may be used within a security core within an integrated circuit. For example, a system-on-chip (SoC) may have one or more processor cores, memory, as well as other functional units. The SoC also includes a security core and secure memory. The security core may include a challenge generator that generates a challenge based on a preshared key, for example. The preshared key can be mixed with a random digital value to create a random challenge to authenticate another entity that knows the preshared key in a challenge-response authentication process. In one embodiment, the self-timed digital RNG 600 is part of the CryptoFirewall™ product, developed by Cryptography Research, Inc. of San Francisco, Calif. The CryptoFirewall™ product may rely on a RNG provided by an ASIC partner to mix with a random digital value from the self-timed digital RNG 600 to generate the random challenge. Alternatively, the self-timed digital RNG 600 may be part of other cryptographic systems, and can be used in other applications than random challenges. The self-timed digital RNG 600 can provide the necessary amount of randomness, as measured by an entropy metric, for the security core. The random digital value generated by the self-timed digital RNG 600 could also be used without mixing with the ASIC partner's RNG. The self-timed digital RNG 600 is an all-digital circuit implementation, building using standard-cell gates. The self-timed digital RNG 600 can be automatically placed and routed using automation tools, requiring less hand-tuning and hand-layout, or no hand-tuning and hand-layout of the circuit. The self-timed digital RNG 600 can be tested using low-cost, all-digital manufacturing tests.

Figure 7:
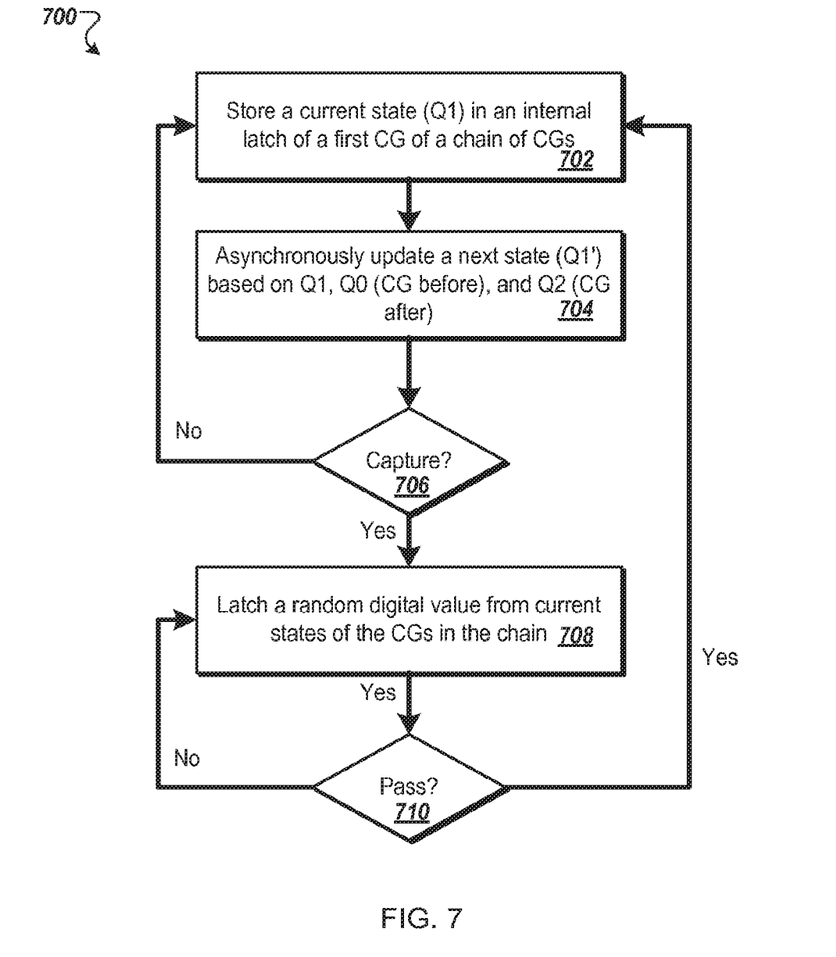
FIG. 7 is a flow diagram of a method of generating a random digital value using a self-timed, digital random number generator (RNG) according to one embodiment.

FIG. 7 a flow diagram of a method 700 of generating a random digital value using a self-timed, all-digital random number generator (RNG) according to one embodiment. The method 700 may be performed by any of the chain of CGs described herein. The method 700 begins with storing a current state (Q1) in an internal latch of a first chaotic generator (CG) (block 702). The first CG is located in a chain of CGs organized in a ring topology. Asynchronous digital logic, coupled to the internal latch, asynchronously updates a next state (Q1') of the CG based on the current state (Q1), a second state (Q0) of a second CG that is before the first CG in the chain, and a third state (Q2) of a third CG that is after the first CG in the chain (block 704). The Q1, Q0, and Q2 update asynchronously at individual update rates. At block 708, FFs latch a random digital value from outputs of the chain of CGs in response to a control signal received at block 706. The capture signal puts the RNG in capture mode when active. However, if no capture signal is received, the RNG continues to generate random numbers asynchronously based on changes to the states of the individual CGs that are updated at different update rates. In effect, the method 700 returns to repeat blocks 702, 704. At block 710, it is determined if the pass mode is active (capture signal is not active). Until the pass mode is active at block 710, the method continues in capture mode at block 708. When the pass mode is active, the method 700 returns to blocks 702 to asynchronously update states of the individual CGs. As described above, entropy of the random digital value is based on the self-timed nature of the chaotic generators, as well as the metastability of internal latches of the chain of CGs.

In a further embodiment, at block 704, the next state is updated by performing a one-dimensional binary cellular automation rule equation by the asynchronous digital logic. The one-dimensional binary cellular automaton rule equation is at least one of Rule-30, Rule-86, Rule-135, or Rule-149. Alternatively, other update rule equations may be used. In one embodiment, the next state (Q1') is determined by the following equation: Q1'=Q0 XOR (Q1 OR Q2).

In a further embodiment, the random digital value is mixed with another random number generated by a RNG on the same integrated circuit. In another embodiment, the random digital value is used in connection with a challenge/response authentication process as described herein.

Figure 8:
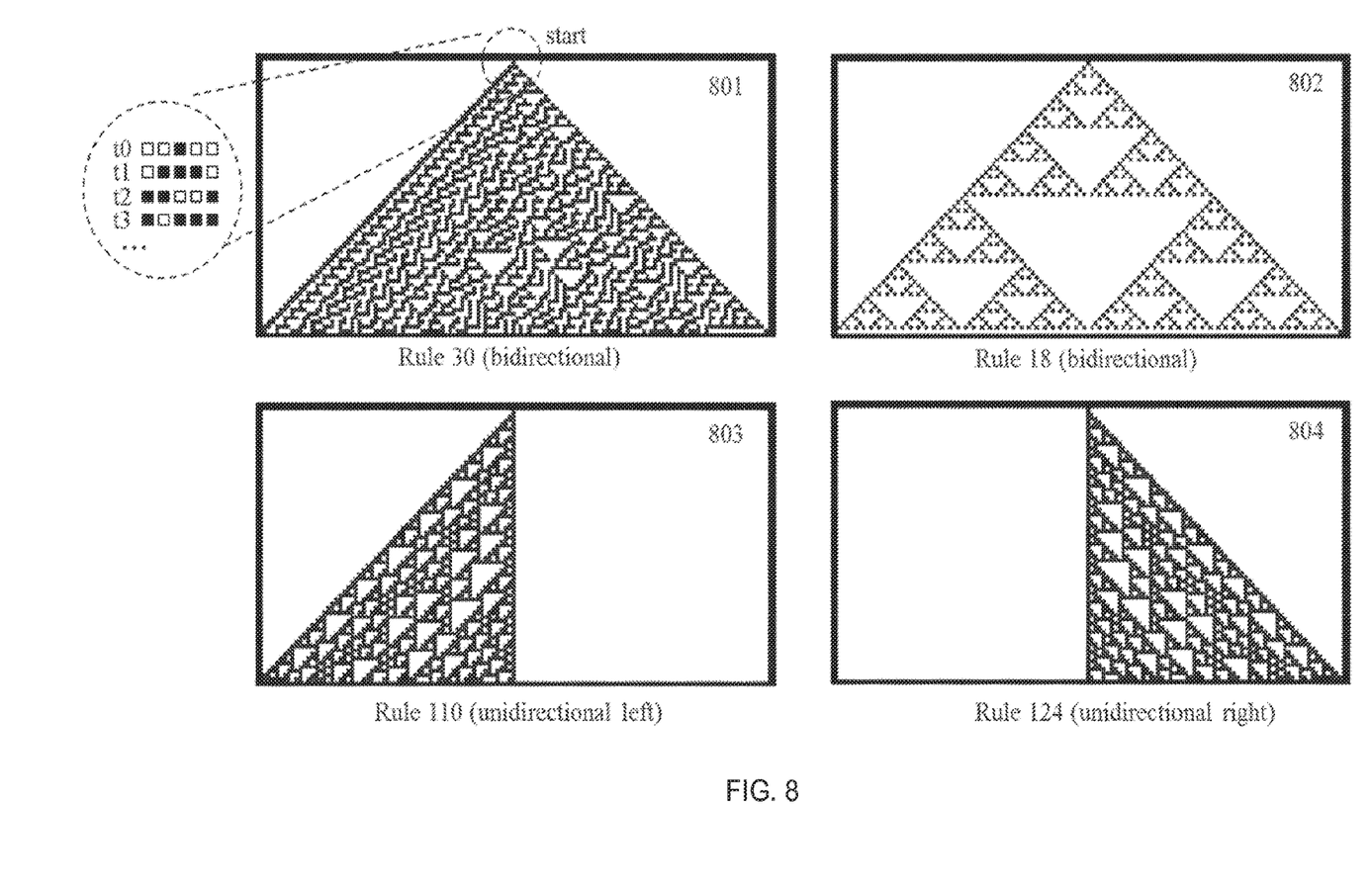
FIG. 8 illustrates the pattern generation nature of four different update rules.

FIG. 8 illustrates the pattern generation nature of four different update rules. In these figures, a 128-bit synchronous one-dimensional cellular automata (CA) (such as the one shown in the top half of FIG. 2) was simulated, with the center bit (bit 64) initialized at time "t0" to a binary value "1" (represented with a dark-colored pixel), with all other bits initialized to "0" (represented by a white-colored pixel). Each row, starting from the top and moving downwards, shows the advancement of the pattern from t0 to t1, t2, t3, etc. The development of Rule-30 is illustrated in box 801. There are two observations about its structure: first, it appears to be chaotic in that, while it derives from an initial state, its pattern is visibly complicated and unpredictable. In fact, in Jen's "Aperiodicity in one-dimensional cellular automata" (published by Physica D Nonlinear Phenomena, 1990), it was shown that the pattern between any two adjacent cells in the rule-30 progression is non-periodic. The second observation about the structure is that it proceeds "bidirectionally" from the initial condition. That is, although only the center bit was initialized to a "1" at time t0, the pattern moves both "forwards" and "backwards" through the 128-bit CA (i.e., the value in bit 64 at time t0 influences the value in both bits 63 and 65 at time t1). This has interesting implications when the CA is configured as a ring: the forward and backwards update events (which, when constructed as an electronic circuit, will manifest as voltage transitions) will eventually "collide" with each other, constructively or destructively interfering. The patterns by this interference are well-known in synchronous ring structures (see Wolfram's "Cryptography with Cellular Automata"; published by the Institute for Advanced Study, Princeton, N.J.; 1985), but are much more unpredictable for a ring built with self-timed elements, as each element in the ring will propagate the events to its two neighbors with unpredictable timing. It is for these two reasons that Rule-30 makes an effective generation rule for a self-timed ring for the purposes of random-number generation.

There are many other update rules which also generate bidirectional patterns, as is illustrated with Rule-18 whose progression is shown in box 802. The pattern's structure is visibly more regular than Rule-30 patterns, but the bidirectional nature implies it could be effective in a self-timed ring used for random-number generation purposes. Other update rules generate patterns which are unidirectional, as illustrated by Rule-110 (which proceeds "leftwards" as shown in box 803) and its symmetric partner Rule-124 (which proceeds "rightwards" as shown in box 804). Update rules which generate unidirectional patterns, even complicated ones, may not be as effective as update rules that generate bidirectional patterns, as the ring will not exhibit the unpredictable interference of update events (i.e., voltage transitions) moving forwards and backwards along the ring. It is possible in other embodiments that a self-timed ring could be constructed using elements with different update rules, one type which creates unidirectional update events in one direction, and a second type which creates update events in the other direction. Such a heterogeneous, hybrid ring may exhibit properties similar to a homogeneous ring constructed with elements generating bidirectional events. As described herein, note also that multiple update rules can be combined in the same ring, including two or more different update rules that generate either bidirectional and/or unidirectional patterns.

For example, in one embodiment, the asynchronous digital logic implements a one-dimensional binary cellular-automata update rule that generates a bidirectional pattern within the chain of CGs (which cause unpredictable interferences within the ring, which improves the quality of random-number generation observable at the outputs). In another embodiment, the asynchronous digital logic implements two or more one-dimensional binary cellular-automata update rules that each generates a bidirectional pattern within the chain of CGs. In another embodiment, the asynchronous digital logic implements at least one one-dimensional binary cellular-automata update rule that causes unidirectional update events in a first direction of the chain of CGs and at least one second asynchronous logic, of a second CG for example, that implements a second one-dimensional binary cellular-automata update rule that causes unidirectional update events in a second direction of the chain of CGs.

In the above description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "encrypting," "decrypting," "storing," "providing," "deriving," "obtaining," "receiving," "authenticating," "deleting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this disclosure, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this disclosure and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth above are merely exemplary. Particular implementations may vary from these exemplary details and still be contemplated to be within the scope of the present invention.

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

While the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

What is claimed is:

1. A random number generator comprising:
a plurality of self-timed pattern generators organized in a chain or ring topology, each comprising an internal latch storing a correcsponding state, wherein asynchronous digital logic in a first generator of the plurality of self-timed pattern generators comprises a first input, a second input, and a third input, wherein the asynchronous digital logic is to asynchronously update and latch a next state based on, at the first input, a current state stored in the internal latch of the first generator, at the second input, a second state stored in the internal latch of a second generator of the plurality of self-timed pattern generators that is before the first generator in the chain or ring topology, and at the third input, a third state stored in the internal latch of a third generator of the plurality of self-timed pattern generators that is after the first generator in the chain or ring topology, and wherein the plurality of self-timed pattern generators is to output a random digital value based at least in part on the current state output from the first generator.

2. The random number generator of claim 1, wherein the asynchronous digital logic circuit comprises:
a first logic gate coupled to a first input and a third input; and
a second logic gate coupled to a second input and an output of the first logic gate;
wherein the internal latch of the first generator is coupled to an output of the second logic gate, wherein the internal latch of the first generator is configured to receive a capture signal, wherein the internal latch of the first generator is configured to permit chaotic pattern generation based on the current state, the second state, and the third state when the capture signal is not active and to stop the chaotic pattern generation when the capture signal is active, wherein the output of the first generator is one bit of the random digital value.

3. The random number generator of claim 2, wherein the first logic gate is an OR gate and the second logic gate is an exclusive OR (XOR) gate, and wherein the internal latch of the first generator comprises:
a multiplexer coupled to the output of the first logic gate and the output of the XOR gate, wherein the multiplexer is configured to pass the output of the XOR gate when the capture signal is not active and to capture the output of the first logic gate when the capture signal is active; and
a pair of sequential inverters coupled between an output of the multiplexer and the output of the first logic gate.

4. The random number generator of claim 3, wherein the next state at the output of the XOR gate is represented by the following equation: $Q1'=Q0$ XOR $(Q1$ OR $Q2)$, where $Q1'$ is the next state, $Q0$ is the second state, $Q1$ is the current state, and $Q2$ is the third state.

5. The random number generator of claim 1, further comprising a plurality of flip-flops (FFs) coupled to outputs of the plurality of self-timed pattern generators and to output the random digital value when clocked by a capture signal, wherein randomness of the random digital value is based on chaos and metastability of the internal latches of the plurality of self-timed pattern generators.

6. The random number generator of claim 5, wherein a first number of the plurality of self-timed pattern generators is greater than a second number of the plurality of FFs, and wherein at least one of the plurality of self-timed pattern generators is not coupled to the plurality of FFs.

7. The random number generator of claim 5, wherein the plurality of self-timed pattern generators is organized in a first N-bit random number generator (RNG), where N is a positive integer, wherein the internal latches of the plurality of self-timed pattern generators are configured to receive the capture signal, and wherein the plurality of FFs is configured to latch a first N-bit value, output from the plurality of self-timed pattern generators, when the capture signal is active.

8. The random number generator of claim 7, further comprising
a value detector logic comprising inputs coupled to the outputs of the plurality of self-timed pattern generators and a reset output coupled to a reset input of one of the plurality of self-timed pattern generators to reset the one of the plurality of self-timed pattern generators when the first N-bit value is a pre-defined value.

9. The random number generator of claim 7, further comprising:
value detector logic comprising a reset output and inputs coupled to the outputs of the plurality of self-timed pattern generators; and
an OR gate comprising a control output and inputs to receive the capture signal and a SET signal from the reset output when the first N-bit value is a pre-defined value;
a second plurality of self-timed pattern generators organized in a second N-bit RNG, wherein internal latches of the second plurality of self-timed pattern generators are configured to receive a second capture signal from the control output of the OR gate, and wherein the second N-bit RNG is to output a second N-bit value; and
XOR logic comprising inputs coupled to the first N-bit RNG and inputs coupled to the second N-bit RNG, wherein the XOR logic comprises outputs coupled to the plurality of FFs, wherein the XOR logic performs an XOR operation on the first N-bit value and the second N-bit value to generate the random digital value that is latched by the plurality of FFs when the capture signal is active.

10. The random number generator of claim 5, further comprising mixing logic coupled to the plurality of FFs to receive the random digital value and coupled to a random number generator to receive a random number, wherein the mixing logic is configured to combine the random digital value with the random number to generate another random number.

11. The random number generator of claim 1, wherein the plurality of self-timed pattern generators is arranged in a ring topology in which the second generator is directly adjacent to the first generator in one direction in a looping sequence and the third generator is directly adjacent to the first generator in another direction in the looping sequence.

12. The random number generator of claim 1, wherein the plurality of self-timed pattern generators is arranged in a daisy-chain configuration.

13. A circuit comprising:
a first self-timed pattern generator;
a second self-timed pattern generator; and
a third self-timed pattern generator coupled to the first self-time pattern generator and the second self-timed pattern generator,
wherein each self-timed pattern generator comprisies an internal latch storing a corresponding state, wherein the third self-timed pattern generator comprises asynchronous digital logic comprising a first input, a second input, and a third input, wherein the asynchronous digital logic is to asynchronously update and latch a next state based on a current state stored in the internal latch of the third self-timed pattern generator at the first input, a second state stored in the internal latch of the first self-timed pattern generator at the second input, and a third state stored in the internal latch of the second self-timed pattern generator at the third input, and wherein an output of the circuit is a random digital value based at least in part on the current state output from the first self-timed pattern generator.

14. The circuit of claim 13, wherein the asynchronous digital logic comprises:
   a first logic gate coupled to a first input and a third input; and
   a second logic gate coupled to a second input and an output of the first logic gate;
   wherein the internal latch of the first generator is coupled to an output of the second logic gate, wherein the internal latch of the first generator is configured to receive a capture signal, wherein the internal latch of the first generator is configured to permit chaotic pattern generation based on the current state, the second state, and the third state when the capture signal is not active and to stop the chaotic pattern generation when the capture signal is active, wherein the output of the first generator is one bit of the random digital value.

15. The circuit of claim 14, wherein the first logic gate is an OR gate and the second logic gate is an exclusive OR (XOR) gate, and wherein the internal latch of the first generator comprises:
   a multiplexer coupled to the output of the first logic gate and the output of the XOR gate, wherein the multiplexer is configured to pass the output of the XOR gate when the capture signal is not active and to capture the output of the first logic gate when the capture signal is active; and
   a pair of sequential inverters coupled between an output of the multiplexer and the output of the first logic gate.

16. The circuit of claim 15, wherein the next state at the output of the XOR gate is represented by the following equation: $Q1'=Q0$ XOR $(Q1$ OR $Q2)$, where $Q1'$ is the next state, $Q0$ is the second state, $Q1$ is the current state, and $Q2$ is the third state.

17. The circuit of claim 13, further comprising:
   a first flip-flop (FF) coupled to the output of the first self-timed pattern generator;
   a second FF coupled to an output of the second self-timed pattern generator; and
   a third FF coupled to an output of the third self-timed pattern generator, wherein the first FF, the second FF, and the third FF are each clocked by a capture signal to output at least a portion of the random digital value, wherein randomness of the random digital value is based on chaos and metastability of the internal latches of the plurality of self-timed pattern generators.

18. The circuit of claim 17, further comprising mixing logic coupled to the first FF, the second FF, and the third FF and coupled to a random number generator to receive a random number, wherein the mixing logic is configured to combine the random digital value with the random number to generate another random number.

19. The circuit of claim 17, wherein the first FF, the second FF, and the third FF are arranged in a ring topology in which the second self-timed pattern generator is directly adjacent to the first self-timed pattern generator in one direction in a looping sequence and the third self-timed pattern generator is directly adjacent to the first self-timed pattern generator in another direction in the looping sequence.

20. The circuit of claim 17, wherein the first FF, the second FF, and the third FF are arranged in a daisy-chain configuration.

* * * * *

UNITED STATES PATENT AND TRADEMARK OFFICE
CERTIFICATE OF CORRECTION

PATENT NO. : 10,503,476 B2
APPLICATION NO. : 16/115917
DATED : December 10, 2019
INVENTOR(S) : Scott C. Best It is certified that error appears in the above-identified patent and that said Letters Patent is hereby corrected as shown below:

In the Claims

In Claim 1, Column 15, Line 4, delete "correcsponding" and insert --corresponding--

In Claim 13, Column 16, Line 64, delete "comprisies" and insert --comprises--

Signed and Sealed this
Fourteenth Day of January, 2020

Andrei Iancu
*Director of the United States Patent and Trademark Office*